US 8,250,478 B2

(12) United States Patent
Dharmarajan et al.

(10) Patent No.: US 8,250,478 B2
(45) Date of Patent: Aug. 21, 2012

(54) STATE PERSISTENCE AND BACKGROUND INITIALIZATION FOR POST-BACK WEB APPLICATIONS

(75) Inventors: Baskaran Dharmarajan, Palo Alto, CA (US); Vladimir Dumitrean, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 12/695,575

(22) Filed: Jan. 28, 2010

(65) Prior Publication Data

US 2011/0185287 A1   Jul. 28, 2011

(51) Int. Cl.
*G06F 3/00* (2006.01)

(52) U.S. Cl. ........ 715/760; 715/752; 715/758; 715/759; 715/209; 715/240; 709/204

(58) Field of Classification Search .................. 715/752, 715/760, 759, 758, 240, 209; 719/329; 709/204–205
See application file for complete search history.

(56) References Cited

U.S. PATENT DOCUMENTS

| | | | | |
|---|---|---|---|---|
| 6,718,313 | B1* | 4/2004 | Lent et al. | 705/38 |
| 6,771,288 | B2* | 8/2004 | Boulter | 715/736 |
| 6,973,627 | B1 | 12/2005 | Appling | |
| 6,990,534 | B2 | 1/2006 | Mikhailov et al. | |
| 7,007,237 | B1 | 2/2006 | Sharpe | |
| 7,069,497 | B1* | 6/2006 | Desai | 715/205 |
| 7,146,563 | B2* | 12/2006 | Hesmer et al. | 715/223 |
| 7,152,203 | B2* | 12/2006 | Gao et al. | 715/240 |
| 7,376,907 | B2* | 5/2008 | Santoro et al. | 715/765 |
| 7,440,997 | B2 | 10/2008 | Colling et al. | |
| 7,464,381 | B1* | 12/2008 | Nickerson et al. | 719/311 |
| 7,487,214 | B2* | 2/2009 | Qureshi et al. | 709/206 |
| 7,546,539 | B2* | 6/2009 | Kibilov et al. | 715/760 |
| 7,640,512 | B1* | 12/2009 | Appling | 715/771 |
| 7,984,376 | B2* | 7/2011 | Yamabuchi et al. | 715/273 |
| 7,987,431 | B2* | 7/2011 | Santoro et al. | 715/765 |
| 2002/0032701 | A1* | 3/2002 | Gao et al. | 707/513 |
| 2002/0194211 | A1 | 12/2002 | Subramanian et al. | |
| 2003/0018714 | A1* | 1/2003 | Mikhailov et al. | 709/203 |
| 2003/0020671 | A1* | 1/2003 | Santoro et al. | 345/1.3 |
| 2004/0093327 | A1* | 5/2004 | Anderson et al. | 707/3 |
| 2004/0181578 | A1* | 9/2004 | Elms | 709/205 |
| 2004/0243928 | A1* | 12/2004 | Hesmer et al. | 715/505 |

(Continued)

OTHER PUBLICATIONS

"Implementing Navigation for the User Interface", Microsoft-specified objectives for the 'Creating User Services' section of 70-315, 'Developing and Implementing Web Applications with Microsoft Visual C# .NET and Microsoft Visual Studio .Net', Chapter 3, Published Nov. 26, 2002, pp. 207-280.

*Primary Examiner* — Weilun Lo
*Assistant Examiner* — Rashedul Hassan
(74) *Attorney, Agent, or Firm* — Vierra Magen Marcus & DeNiro LLP

(57) ABSTRACT

A system is disclosed for reducing the time required to generate web pages on post-back of collaborative web applications. Content from web pages of the collaborative web applications may be displayed in respective foreground and background IFRAMES over a display. Upon post-back to load content from a new web page in the foreground IFRAME, the content from the background IFRAME persists, thus saving the round trip otherwise required to update content from the background IFRAME. Initialization and update of the content in the background IFRAME may be performed when interaction with the content in the foreground IFRAME is idle.

17 Claims, 4 Drawing Sheets

U.S. PATENT DOCUMENTS

| | | |
|---|---|---|
| 2005/0149952 A1 | 7/2005 | Goodwin et al. |
| 2005/0256933 A1 | 11/2005 | Millington et al. |
| 2005/0257131 A1* | 11/2005 | Lim et al. .................. 715/501.1 |
| 2006/0101119 A1* | 5/2006 | Qureshi et al. ............... 709/206 |
| 2006/0212514 A1* | 9/2006 | Saillet .......................... 709/203 |
| 2007/0130293 A1* | 6/2007 | Dong et al. .................. 709/219 |
| 2007/0234195 A1* | 10/2007 | Wells ......................... 715/501.1 |
| 2007/0299857 A1* | 12/2007 | Gwozdz et al. .............. 707/102 |
| 2007/0300064 A1* | 12/2007 | Isaacs et al. ................. 713/168 |
| 2008/0177845 A1* | 7/2008 | Bracewell et al. ............ 709/206 |
| 2008/0183593 A1* | 7/2008 | Dierks ........................... 705/26 |
| 2008/0215997 A1* | 9/2008 | Wu et al. ....................... 715/760 |
| 2008/0263566 A1* | 10/2008 | Buerge et al. ................ 719/317 |
| 2008/0298342 A1* | 12/2008 | Appleton et al. ............. 370/351 |
| 2009/0064183 A1* | 3/2009 | Chijiiwa et al. .............. 719/314 |
| 2009/0070190 A1* | 3/2009 | Gorty et al. .................... 705/10 |
| 2009/0150262 A1* | 6/2009 | Mizhen .......................... 705/27 |

* cited by examiner

STATE PERSISTENCE AND BACKGROUND INITIALIZATION FOR POST-BACK WEB APPLICATIONS

BACKGROUND

Given the increasing popularity of the World Wide Web, content providers continue to look for better and faster ways to present information to users. Web pages are typically written in HyperText Markup Language (HTML), which defines how a web page looks and how a user is able to interact with the web page. The written HTML code is generally stored on a web server, where it may be accessed by a user via a software application called a web browser resident on the user's computing system. Upon a user specifying a URL address of a desired web page, a web browser connects with the web server hosting the web page, fetches the HTML code for the page from the web server, and interprets the code together with any client-side scripts to construct the web page on the user's display.

Once a web page is displayed to the user, a user may generally interact with the web page via the browser to request additional web pages or other resources. These further requests for resources are referred to as post-backs, and a post-back together with the server response are referred to as a round trip. The life cycle of a web page is a single round trip. That is, every time a web server responds to a post-back page request, the web server freshly recreates the resources and information states required to display the new page. The resources and state information of the previous web page are lost when the new web page is generated.

Having to regenerate the resources and state information of a web page upon each post-back can present delays in presenting a web page. This may be especially true for current enterprise service provider web applications, which are designed to provide a great deal of information and interactivity to users. Consequently, these web applications require a significant amount of data and resources to be transferred each time a web page in the application is constructed and displayed. For example, two popular web applications today are Hotmail® web-based e-mail service and Windows Live Messenger instant messaging service. While web applications such as these generate web pages offering a large number of features and rich interactivity to users, they use a lot of data and bandwidth to initialize and generate their web pages. Having to reinitialize and regenerate resources and state information for web pages in applications such as these on each post-back can result in an appreciable delay in the loading of new web pages.

It is also known for two or more web applications to collaborate together so that features of one are combined in the other. For example, a Hotmail web page may include Messenger instant messaging features such as for example to add presence and chat capabilities to email. The consequence of this collaboration is that, upon accessing a new web page in one web application, the resources and state information for both web applications need to be reinitialized and regenerated. This can result in an even further delay in the loading of new web pages.

SUMMARY

Described herein is a method of reducing the time required to generate web pages on post-back of collaborative web applications. Web applications may be said to be collaborative if portions of a first web application may be included within portions of a second web application to augment the operation of the second web application. The second web application may be said to be a foreground application and the first web application may be said to be a background application. In general, upon a user accessing a web application of a set of collaborative web applications, the present technology opens a plurality of IFRAMES. The foreground web application is run in a foreground IFRAME, and the background web application is run in a background IFRAME. Upon a post-back in the foreground application, the resources and state of the background application running in the background IFRAME(s) are maintained. Thus, the resources and state from the background web applications persist and may be plugged into the new foreground application web page.

In an embodiment, the method initially includes a browser interacting with a server to log a user into the foreground web application. The browser then displays content from a first web page of the foreground web application in a foreground IFRAME. The browser may display content from a second web page of the background web application in a background IFRAME. Upon a post-back to request a third web page from the foreground web application, the content in the background IFRAME is persisted. After the post-back, the browser displays content from the third web page in the foreground IFRAME concurrently with the persisted content in the background IFRAME.

In further embodiments, the content for the background IFRAME is obtained and displayed upon an idle period of non-interaction with the first web application. The content in the background IFRAME may also be updated in a post-back request. In embodiments, this post-back request for the background IFRAME is also not initiated until an idle period of non-interaction between the browser and the foreground web application.

DETAILED DESCRIPTION

Figure 1:
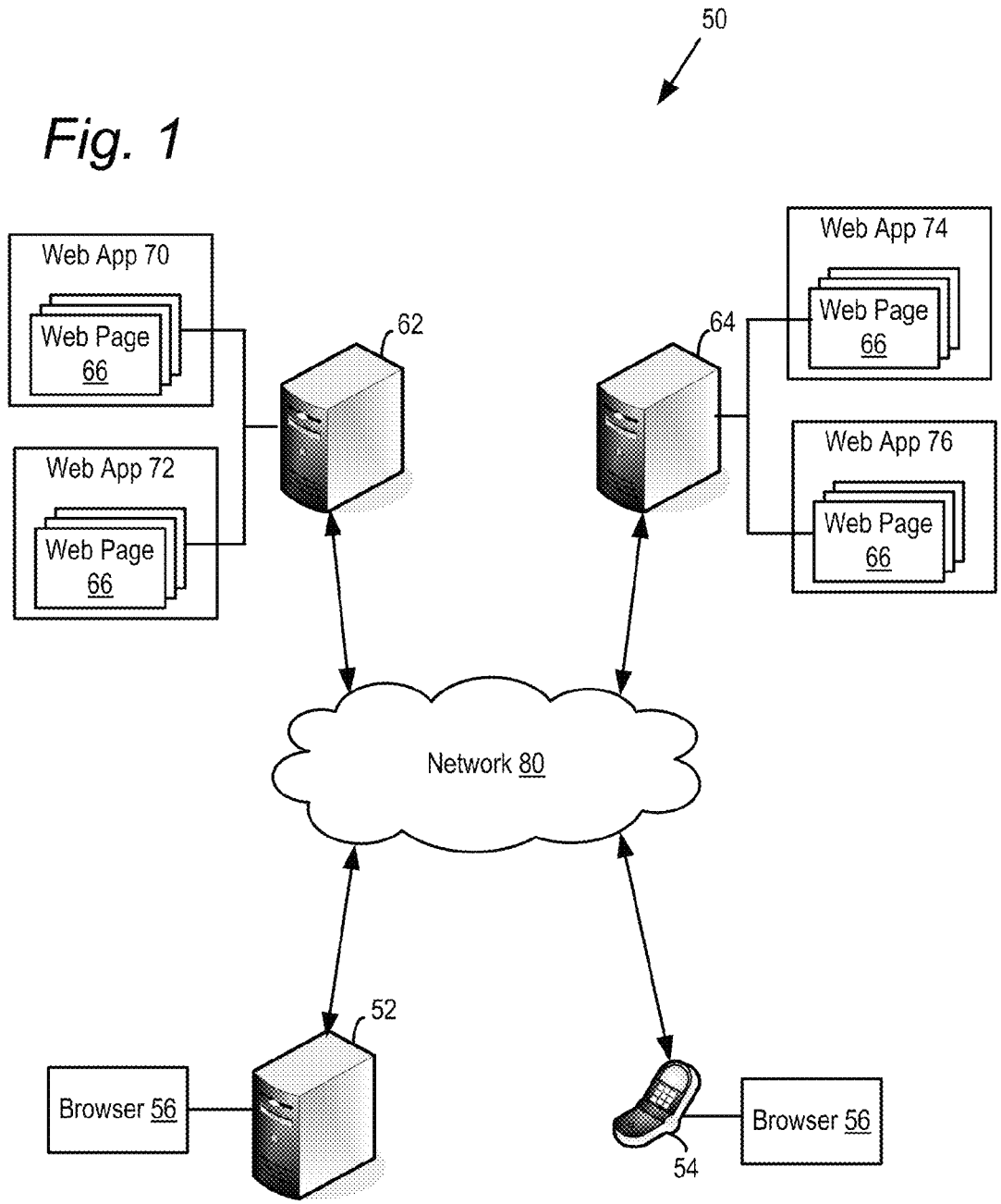
FIG. 1 is a system diagram of a network of web servers and client devices for generating and displaying web pages.

Embodiments of the present technology will now be described with reference to FIGS. 1 through 5, which in general relate to a system for reducing the time required to generate web pages on post-back of collaborative web applications. As used herein, the terms "collaborative web applications" and "collaboration" between web applications refer to a web page rendered by a first web application but augmented to include features of one or more additional web applications. Examples of collaborative applications include Hotmail® web-based e-mail service and Windows Live Messenger instant messaging service. For example, when a user launches the Hotmail web application, it includes features from the Messenger web application that allow a user to see in the mail user agent which Messenger service friends are then online, and allows the user to chat with them instead of communicating by email. Other features of the Messenger web application may be included in the Hotmail web application. It is understood that the present technology is not limited to use with the Hotmail and Messenger web applications, and that it may be used with a wide variety of collaborative web applications.

In general, upon a user accessing a web application of a set of collaborative web applications, the present technology opens a plurality of inline floating frames, or IFRAMES. The accessed web application, referred to herein as a foreground web application, is run in a first of these IFRAMES, which is referred to herein as the foreground IFRAME. In embodiments, the foreground web application includes web pages which are displayed to the user in the foreground IFRAME via the user's browser. The one or more additional web applications which collaborate with the accessed foreground application are referred to herein as background web applications, and these one or more collaborative background web applications are accessed with the foreground application, and each runs in its own IFRAME in the background. IFRAMES running the one or more background web applications are referred to herein as background IFRAMES. At least portions of these background IFRAMES may not be displayed to the user. However, upon a post-back in the foreground application, the resources and state of the background application(s) running in the background IFRAME(s) are maintained.

Thus, upon loading the new foreground application web page, the resources and state from the background web applications persist and are plugged into the new foreground application web page. Persisting the state information and resources of the background IFRAME allows the foreground IFRAME to be regenerated without having to perform a round trip request for the background web application(s).

In a further feature of the present technology, the background web application(s) complete their initializations, and post-back to update their resources and application state, during idle periods of the foreground application. This removes or minimizes any delay which would otherwise occur if the foreground application was required to wait for the background application(s) to update upon a post-back in the foreground application. The foreground IFRAME and web page application may also be referred to herein as the first IFRAME and first web page application, and the background IFRAME and web page application may also be referred to herein as the second IFRAME and second web page application.

Referring initially to FIG. 1, there is shown a high level system architecture 50 consisting of client-side computing devices 52, 54 capable of communicating with web servers 62, 64 via a network 80. The computing device 52 may be a personal computer or laptop, and the computing device 54 may be a handheld computing device such as a smart phone. Two computing devices 52, 54 are shown to illustrate that the present technology may operate with different client-side computing devices. The system 50 may alternatively include one of the computing devices 52, 54, or it may include client-side computing devices in addition to or instead of the computing devices shown in FIG. 1. Further details relating to an embodiment of a sample computing device are explained below with reference to FIG. 2.

Each computing device may include a browser application, or browser, 56. The operation of browsers 56 are known, but in general, the computing devices 52, 54 each run a version of a browser 56 as part of their operating system capable of accessing and retrieving web pages from web servers such as servers 62 and 64. The browser 56 on a computing device 52, 54 retrieves an electronic document, or web page, 66 from a web site, i.e., one of web servers 62, 64, and displays the web page 66 on a monitor 191 (FIG. 2) or other output device. To view the electronic document 66 as a web page, the user specifies a URL identifying the particular document 66 in the browser 56. A URL may be specified by entering a URL character string using a user input interface, by selecting a hyperlink specifying the URL in an HTML document currently being displayed in the browser 56, or by selecting a URL from a list provided by the browser. In response to the entered URL, the browser generates a request command for the URL and transmits the request over the network 80 to fetch the document 66 using conventional Internet protocols, such as the Hypertext Transport Protocol (HTTP).

Servers 62, 64 are computing devices configured to host web pages such as different web pages 66. Each web page 66 is rendered as part of a web application 70, 72, 74, 76, and each such web application may have a single web page or multiple web pages. While two web servers 62, 64 are shown, the present technology may operate with a single server or more than two servers. Each server is shown hosting different web pages 66 from two collaborative web applications (server 62 is shown as having web pages from web applications 70 and 72, and server 64 is shown as having web pages from web applications 74 and 76). However, it is understood that a single server may host web pages from more than two web applications, some or all of which may collaborate with each other. Moreover, in embodiments, web applications which collaborate with each other may be spread across different servers.

A web application 70, 72, 74, 76 may be run on web servers 62, 64, or it may have aspects hosted on other associated servers, such as for example mail and/or messenger servers. In embodiments, a server 62, 64 may be part of an enterprise service provider, such as for example Windows Live™ service or the MSN® portal hosted by Microsoft Corp. Further details relating to an embodiment of a sample server are explained below with reference to FIG. 2. The network 80 allowing communication between computing devices 52, 54 and web servers 62, 64 may be a closed network such as a LAN, or it may be an open network such as the Internet.

Each of computing devices 52, 54 and web servers 62, 64 may be comprised of a general computing system environment 100 which is now explained with reference to FIG. 2. The computing system environment 100 is only one example of a suitable computing environment and is not intended to suggest any limitation as to the scope of use or functionality of the system. Neither should the computing environment 100 be interpreted as having any dependency or requirement relating to any one or combination of components illustrated in the exemplary computing environment 100.

In addition to or instead of one or more of the devices described above, the functions of one or more of the above-described devices may be performed by numerous other general purpose or special purpose computing system environments or configurations. Examples of other well known computing systems, environments, and/or configurations that may be suitable for use with the system include, but are not limited to multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices.

Figure 2:
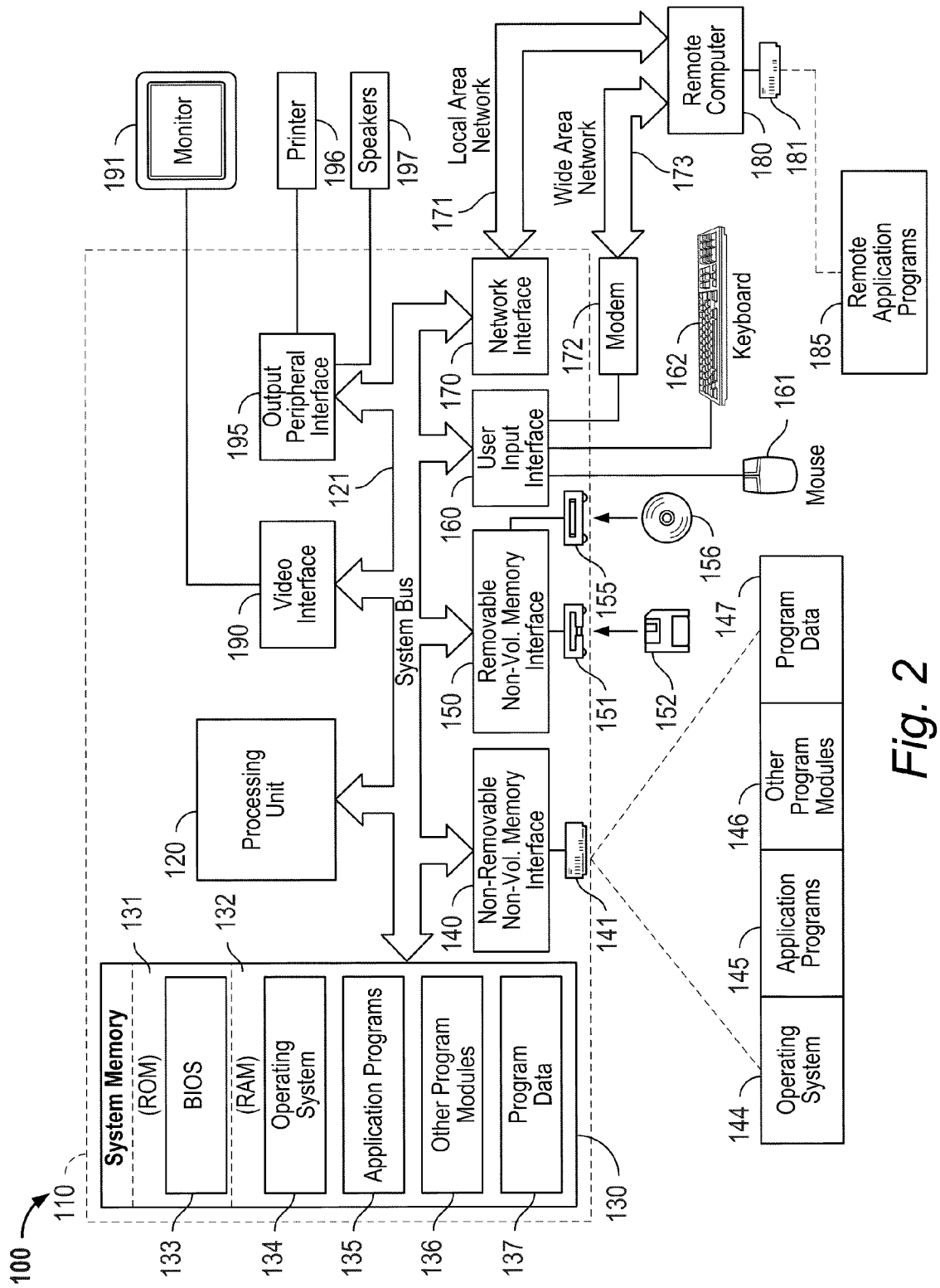
FIG. 2 illustrates an example embodiment of a computing environment that may be used to implement aspects of the present technology.

FIG. 2 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as ROM 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computer 110 may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include examples of network 80, which may be a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
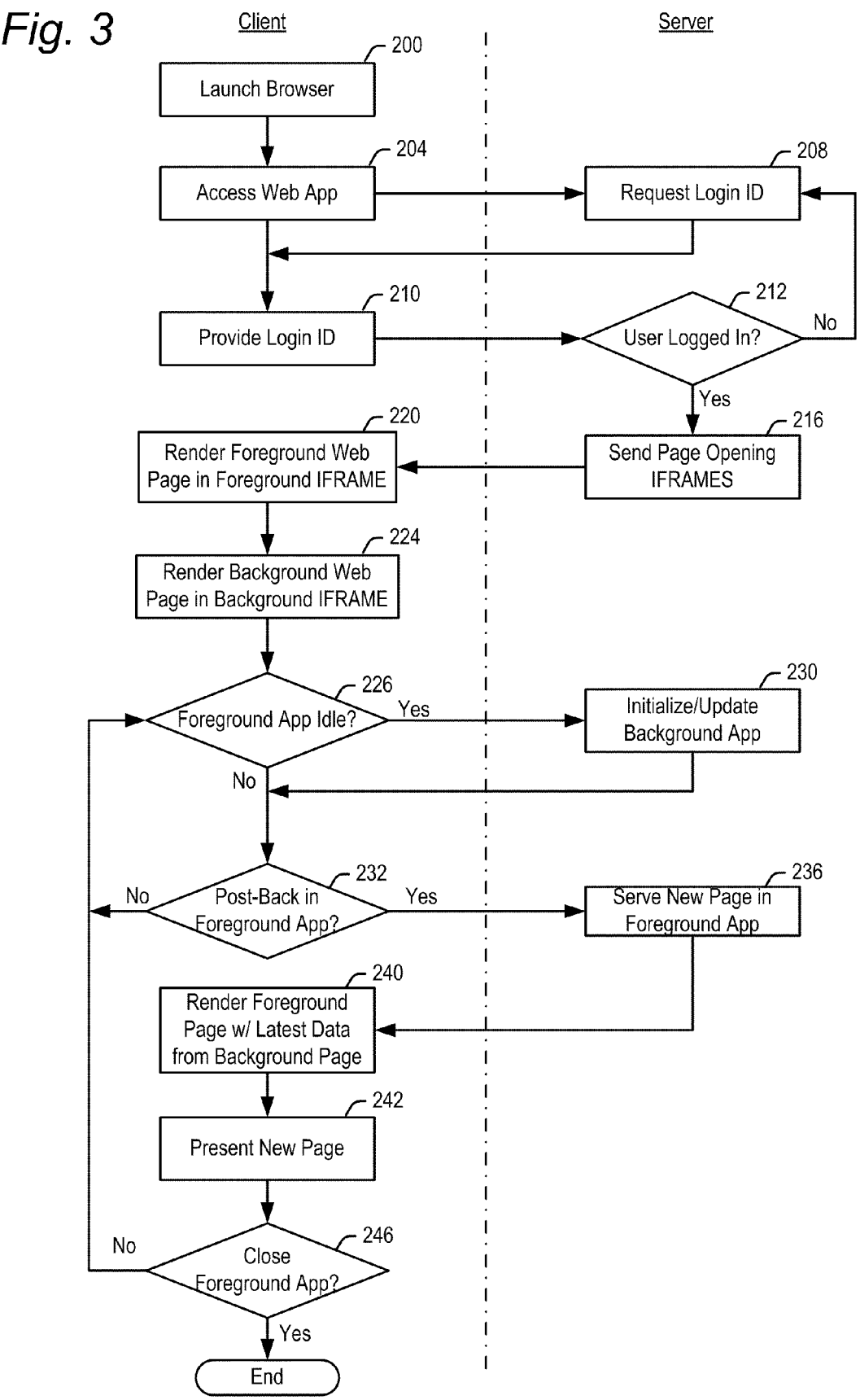
FIG. 3 is a flowchart of the operation of an embodiment of the present technology.
Figure 4:
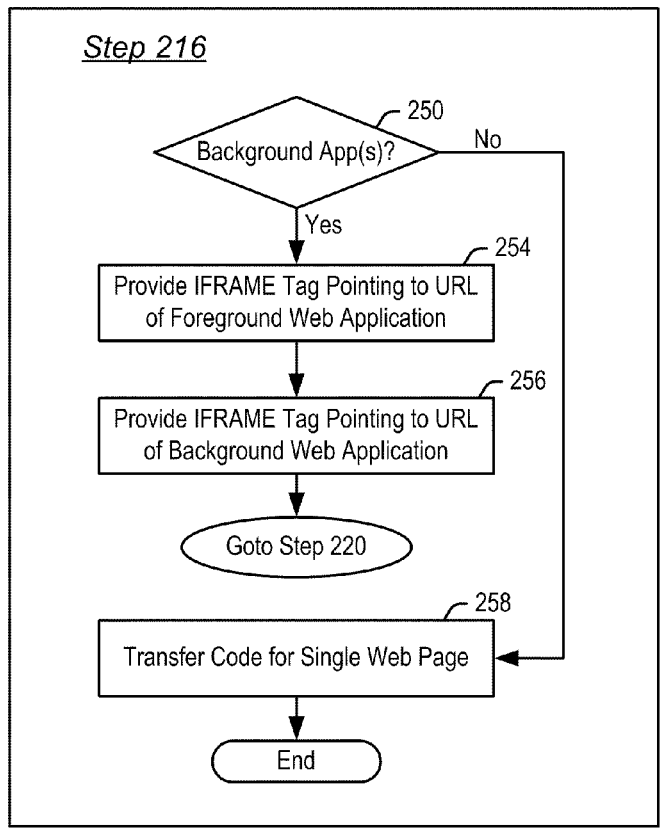
FIG. 4 is a flowchart showing the steps entailed in presenting collaborative web applications in foreground and background IFRAMES.

The operation of the present system is now further described with reference to the flowcharts of FIGS. 3 and 4 and the block diagram of FIG. 5. A user of a device 52, 54 begins by launching their browser 56 in step 200 and accessing a desired web application via the browser in step 204. Many collaborative web applications store user information and require user login. In step 208, the web server 62, 64 sends a request for login ID credentials. The ID credentials are provided in step 210 and verified in step 212. If the user has not properly logged in, the web server may return to step 208 to again request the user's login ID. As is known, if the user has trouble logging in, the server may prompt the user with ID questions and/or the server may block access to the user if the user provides incorrect login ID credentials a predetermined number of times.

Assuming the user is properly logged in in step 212, the server may send an electronic document 66 including HTML, XML or other code which is interpreted by the browser to set up a web page for the user in step 216. Further details of step 216 are provided in the flowchart of FIG. 4. In accordance with the present technology, when the web server logs a user into a given web application, the web server may further open one or more additional web pages of collaborative web applications to run in the background while the user-selected web application runs in the foreground. In step 250, if there is a collaborative background web application to run with the foreground web application, the HTML code for the foreground web application will provide an IFRAME tag specifying the web page code to be displayed within the foreground IFRAME in step 254.

As is known, an IFRAME tag defines an inline frame of external objects, including possibly other HTML documents, for the inclusion within a web page. The foreground IFRAME tag may include a source attribute specifying the location of the HTML document to be rendered as the foreground web page. This source location may be the same web server which handled the login authentication protocol or a different server. Alternatively, instead of pointing to a source elsewhere, the source attribute may be omitted, and the code to be rendered within the foreground IFRAME may simply follow the foreground IFRAME tag.

Further attributes of an IFRAME tag specify where on a web page the IFRAME is to appear. It is a feature of IFRAMES that they may be layered atop each other, and at least portions of an IFRAME may be transparent, i.e., not rendered on the user display. It is a further feature of IFRAMES that two IFRAMES on a web page may be configured to interact with each other so that one IFRAME can send commands to the other, or there may be a mutual exchange of commands between the IFRAMES.

The HTML code for the foreground application will also provide another IFRAME tag specifying the source location of the code for the background web page in step 256. Again, this location may be the same web server which handled the login authentication protocol, a different server, or the source attribute may be omitted and the code to be rendered within the background IFRAME may simply follow the background IFRAME tag.

It is conceivable that a foreground application will collaborate with more than one background web application. In this case, there will be separate IFRAME tags for each of the collaborative background web applications so that each background web application will have web pages opened in different overlying background IFRAMES. If the main web application accessed by a user has no collaboration with other web applications and runs by itself, the server will respond with the HTML code to construct the called web page (step 258), as in normal web page operation, and the present technology takes no further steps.

In the above-described steps, all background web applications which collaborate with a selected foreground web application are automatically opened in their own IFRAME upon authentication and initialization of the main foreground web application. However, those of skill in the art will appreciate that the opening of background collaborative applications may be at the option of the user. For example, a user may open a first web page. Thereafter, the user may open a second web page. If there is collaboration between these web pages, this fact may be stored in the HTML code for one or both web pages. Upon opening the second web page, the two pages may be re-rendered in respective IFRAMES in a single web page. The code for the collaborative web applications may further note that, when both are opened, one web page is to run in the foreground and the other web page is to run in the background. The pages are thus opened in the appropriate foreground and background IFRAMES. Alternatively, the user may be given the option to specify which web page is to run in the foreground and which in the background.

In step 220, the browser 56 fetches the code including the foreground IFRAME tag. Upon encountering the IFRAME tag for the foreground web page content, the browser goes to the URL specified in the foreground IFRAME tag and fetches the code at that URL for rendering the foreground web page content. As indicated, the source attribute may be omitted, in which case the browser retrieves the code that follows the foreground IFRAME tag. The browser interprets the fetched foreground web page code, and that web page content is rendered in the foreground IFRAME in step 220.

In step 224, the browser 56 fetches the code including the background IFRAME tag. Upon encountering the IFRAME tag for the background web page, the browser goes to the URL specified in the background IFRAME tag and fetches the code at that URL for rendering the background web page content. As indicated, the source attribute may be omitted, in which case the browser retrieves the code that follows the background IFRAME tag. The browser interprets the fetched background web page code, and that web page content is rendered in the background IFRAME in step 220. The background web page may be loaded into the background IFRAME and some or all of it may remain invisible to the user.

The following is an sample of the HTML code which may be used in an embodiment to implement an IFRAME. Those of skill in the art will appreciate how to adapt the following code for generating foreground and background IFRAMES, where at least portions of the background IFRAME may not be displayed. Those skilled artisans will further appreciate a wide variety of other tags, scripts and coding steps which may be used to set up the described foreground and background IFRAMES.

```
<html style="overflow:hidden;">
<head>
  <base href="<%= BaseUrl %>" />
  <script type="text/javascript">
```

-continued

```
<%-- lower the domain
    The first check verifies that default.aspx
    is in fact loading in the top window
    if it is not then we break out of the frame.
--%>
if( window.top != self )
    window.top.location.href = self.location.href;
else
    document.domain =
        "<%= LoweredDomain %>";
function mainFrameLoad( )
{
    try
    {
        document.title = window.frames[0].document.title;
    }
    catch(e)
    {
    }
}
</script>
</head>
<body
style="padding:0;margin:0;overflow:visible;height:100%;width:100%;
position:absolute">
<div style="position:absolute;height:100%;width:100%">
    <iframe onload="mainFrameLoad( )" src="<%= PageUrl %>"
        frameborder="0" width="100%" height="100%"
        marginheight="0" marginwidth="0">
    </iframe>
    <iframe frameborder="0" width="0" height="0"></iframe>
</div>
</body>
</html>
```

The above coding steps generate an IFRAME and give the name of the web page to be displayed within the IFRAME.

It is a feature of the present technology that the code for rendering the background web page may be fetched by the browser during idle periods of non-interaction between the browser and the foreground web application. In this manner, the post-back and loading of content for the foreground web application proceeds without delays which may otherwise be caused waiting for the background IFRAME code to be retrieved. Thus, in step 226, the browser checks whether the foreground application is idle. For example, the browser may check whether the foreground application is between DOCUMENT.ONLOAD and DOCUMENT.ONUNLOAD operations. If so, a request is made to the server which in turn sends the code in step 230 to initialize the background application (when the foreground and background web pages are initially loaded) or to update the background application (after a background web page has been initialized and loaded).

As one example of the above-described steps, a user may access his or her Hotmail web mail account. Hotmail web mail may collaborate with Messenger instant messaging. For example, the Hotmail web page may display a presence indicator showing which of the user's friends are then logged into Messenger, and a chat option within the Hotmail web page to initiate an instant messaging chat.

In this example, upon login to Hotmail, the Hotmail web server loads the Hotmail home page in a foreground IFRAME displayed to the user, and attempts to load a Messenger web page in a background IFRAME that is partially hidden from view. The HTML code for the Messenger web page may be broken down into discrete chunks of compressed data, for example 30 Kb each. Thus, once the browser has loaded the Hotmail home page and senses an idle condition, the browser may then download the first chunk of the Messenger web page code. The browser will continue to download the data for the Messenger web page until the Messenger web page data has been completely downloaded or the browser receives a post-back request in the Hotmail web page running in the foreground IFRAME. Once an interaction with the foreground web application is commenced, the browser will complete the download of the data chunk it is then downloading, and cease further download operations of the background web application until an idle period is again detected in the foreground application.

Updates to content such as the resources and state information in the background web application are periodically performed in the same manner. If interaction with the foreground web application is idle in step 226, the browser may update the background application. For example, continuing with the Hotmail/Messenger illustration, users who logon and logoff of Messenger may periodically be updated in the background IFRAME upon an idle period with Hotmail in the foreground. Thus, updated background content is available to the foreground IFRAME upon download of new foreground web page content without requiring a round trip for the background content during the time critical period when the foreground content is loading.

In step 232, the browser looks for a post-back in the foreground web application. For example, from the user's home page in the Hotmail mail user agent, the user may select the option to compose an email (or view the inbox folder, sent folder, etc.), resulting in a post-back request to the server. The server responds with the code for the requested web page in step 236. In step 242, the new foreground web page may be displayed in the foreground IFRAME, updated with the latest resources and state information from the background web page running in the background IFRAME.

It is a further feature of the present technology that, upon post-back in the foreground web application in step 232, the state of the background application persists. This is made possible by the fact that the background web application is running in the background IFRAME. Thus, upon post-back in the foreground IFRAME, the state of the previous web page in the foreground IFRAME is lost, but the state of the web page in the background IFRAME is persisted. As indicated above, communication between IFRAMES is known and may be accomplished with tags in the foreground web page code and/or tags in the background web page code.

Accordingly, in step 240, upon return of the new web page in the foreground IFRAME in step 236, that web page may be updated with the latest state information from the background web application running in the background IFRAME in step 242. This state information was updated in the background IFRAME during an earlier idle period of the foreground web application, and thus, there is no need for a post-back operation in the background web application when a new web page is displayed in the foreground application. This allows the web page to be displayed in the foreground IFRAME without a delay which might otherwise occur if the background web application were updated at the time of post-back in the foreground web application.

In step 246, the browser 56 looks at whether the user ends his or her session with the foreground application. If not, the browser continues to look for idle periods of non-interaction with the foreground web application to update the background web application (step 226) and post-backs in the foreground web application (step 232). If the foreground application is closed in step 246, the operation of the present technology may end. It may also happen that the user may navigate away from the foreground web application to a new page which does not have a collaboration with the background application. Alternatively, the user may attempt to navigate to a web page which may not be run in IFRAMES, such as for example pages rendered via Hypertext Transfer Protocol Secure (HTTPS). In these cases, the foreground and background IFRAMES may be closed, and the new page rendered in its own web page.

Figure 5:
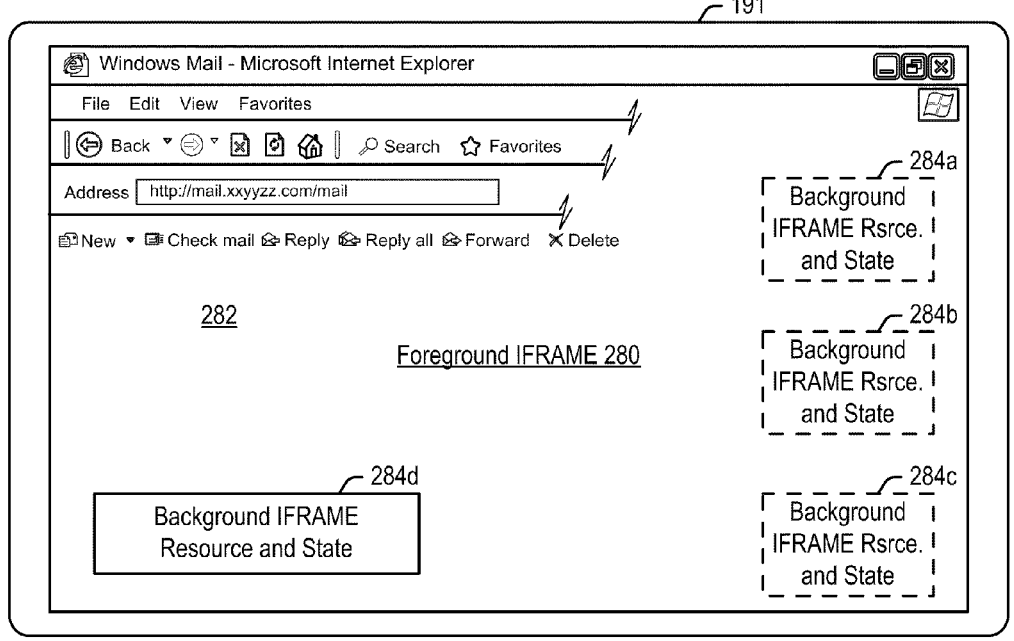
FIG. 5 is a diagram showing multiple IFRAMES instantiated in the operation of embodiments of the present technology.

FIG. 5 is an example diagram of the IFRAMES which may be instantiated for foreground and background web applications according to embodiments of the present technology. FIG. 5 shows a foreground IFRAME 280 in which may be displayed a foreground web page 282 for a mail user agent such as Hotmail (only partially illustrated for clarity). The background IFRAME consists of resources and state information 284a, 284b and 284c which are not displayed, and resource and state information 284d which is displayed. As discussed above, the background web application may for example be a Messenger instant messaging web application, and the resource 284d may for example be an indication of the user's friends then logged into Messenger. Other resources for the foreground and background web pages are contemplated.

As described above, the user may initiate an action resulting in a post-back to the server and a loss of all the resources and state information in the foreground IFRAME 280. According to the present technology, all of the resources and state information in the background IFRAME may persist upon the post-back in the foreground web application. The present system of using IFRAMES to persist state data of background web applications and to reduce roundtrip download times in the foreground web application offers improvements over prior art attempts to solve these problems. Such prior solutions involve caching of state information, cookies, DOM storage and AJAX. However, these prior solutions have limitations as to the amount and/or type of persistent state information which may be stored, as well as memory leakage over time. These problems are all avoided with the use of IFRAMES according to the present system.

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method of generating a web page including content from a first web application and a second web application, the method comprising the steps of:
    (a) transferring code to display content from a first web page of the first web application in a first IFRAME;
    (b) transferring code including resources and state information from the second web application in a second IFRAME, said step (b) being initiated during idle periods of non-interaction with the first web application;
    (c) receiving a post-back request in the first web application to obtain a second web page; and
    (d) transferring code to display content from the second web page of the first web application in the first IFRAME in response to said step (c) and the resources and state information are persisted within the second IFRAME from before said (c).

2. The method of claim 1, further comprising the step of receiving a post-back request in the second web application only during idle periods of non-interaction with the first web application.

3. The method of claim 1, said step (b) of transferring code including resources from the second web application in a second IFRAME comprising the step of transferring code to display a first resource and transferring code to download resources that are not displayed.

4. The method of claim 1, said step (b) of transferring code including resources from the second web application in a second IFRAME comprising the step of transferring resources that persist through a post-back in the first IFRAME.

5. The method of claim 1, further comprising the step of transferring code including state information for the second web application that persists through a post-back in the first IFRAME.

6. The method of claim 1, said steps (a) through (d) being performed by a computing device that performs authentication protocols for authenticating a user to the first web application.

7. One or more processor-readable storage media comprising processor-executable instructions that, when executed, direct a browser application to perform the steps of:
    (a) configuring a first IFRAME to display on a monitor content of a first web page from a first web application;
    (b) configuring a second IFRAME to receive at least one of resources and state information from a second web application, said step (b) being initiated upon an idle period of non-interaction with the first web application;
    (c) posting-back to request a second web page in the first web application upon receiving indication of the request in the first IFRAME;
    (d) configuring the first IFRAME to display content of the second web page from the first web application in response to said step (c); and
    (e) displaying content from the second IFRAME together with the content in the first IFRAME, the content displayed from the second IFRAME in said step (e) persisting from before said step (d).

8. The one or more processor-readable storage media of claim 7, the method further comprising the step (f) of posting-back to request additional content from the second web application for the second IFRAME, the browser waiting until an idle period of non-interaction with the first web application to perform the post-back of said step (f).

9. The one or more processor-readable storage media of claim 8, said step (e) of displaying content from the second IFRAME together with the content in the first IFRAME comprising the step of displaying content from the second IFRAME that was updated in response to said step (f) of posting back to the second web application.

10. The one or more processor-readable storage media of claim 7, said step (a) configuring the first IFRAME to display content of a web mail application, and said step (b) configuring the second IFRAME to receive at least one of resources and state information from an instant messaging web application.

11. The one or more processor-readable storage media of claim 10, said step (e) comprising the step of displaying users available for an instant messaging chat within a web page for an email.

12. The one or more processor-readable storage media of claim 7, said steps (a) and (b) being performed upon the browser accessing the first web page.

13. The one or more processor-readable storage media of claim 7, said steps (a) and (b) being performed only upon the browser accessing both the first and second web pages independently and concurrently.

14. One or more processor-readable storage media comprising processor-executable instructions that, when executed, direct a browser application to perform the steps of:
 (a) logging a user into a foreground web application;
 (b) displaying content on a display in a foreground IFRAME, the content in the foreground IFRAME coming from a first web page of the foreground web application, the foreground web application being an email web application;
 (c) displaying content on the display in a background IFRAME concurrently with the content in the foreground IFRAME, the content in the background IFRAME coming from a second web page of a background web application, the background web application displaying users available for an instant messaging chat, the foreground web application collaborating with the background web application;
 (d) posting-back to request a third web page from the foreground web application upon receiving indication of the request in the foreground IFRAME;
 (e) persisting the content in the background IFRAME across the post-back of said step (d);
 (f) displaying content from the third web page on the display in the foreground IFRAME; and
 (g) displaying content on the display in the background IFRAME persisted in said step (e) concurrently with the content from the third web page in the foreground IFRAME.

15. The one or more processor-readable storage media of claim 14, wherein content displayed in said step (c) is downloaded in discrete chunks of data from the second web page of the background web application, download of a discrete chunk being initiated upon detection of an idle period of non-interaction with the foreground web application.

16. The one or more processor-readable storage media of claim 14, the method further comprising the step (h) of posting-back to request additional content from the background web application for the background IFRAME, the browser waiting until an idle period of non-interaction with the foreground web application to perform the post-back of said step (h).

17. The one or more processor-readable storage media of claim 16, said step (g) of displaying content on the display in the background IFRAME concurrently with the content from the third web page in the foreground IFRAME comprising the step of displaying content from the background IFRAME that was updated in response to said step (h) of posting back to the background web application.

* * * * *